US006764532B1

(12) United States Patent
Cheng

(10) Patent No.: US 6,764,532 B1
(45) Date of Patent: Jul. 20, 2004

(54) METHOD AND APPARATUS FOR FILTERING EXHAUST PARTICULATES

(75) Inventor: Shi-Wai S. Cheng, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/378,270

(22) Filed: Mar. 3, 2003

(51) Int. Cl.[7] .............................................. B01D 29/56
(52) U.S. Cl. ..................... 95/287; 55/350.1; 55/485; 55/489; 55/523; 55/DIG. 30; 428/179
(58) Field of Search ................... 55/350.1, 485, 55/489, 523, DIG. 12, DIG. 30; 95/286, 287; 428/179; 261/112.1, 112.2

(56) References Cited

U.S. PATENT DOCUMENTS

| | | | |
|---|---|---|---|
| 2,723,725 A | * 11/1955 | Keiffer | 55/291 |
| RE26,945 E | * 8/1970 | Muller | 55/489 |
| 3,807,144 A | * 4/1974 | Graybill | 96/292 |
| 4,364,761 A | 12/1982 | Berg et al. | 55/523 |
| 4,390,355 A | 6/1983 | Hammond, Jr. et al. | 55/523 |
| 4,423,090 A | 12/1983 | Hammond, Jr. et al. | 427/181 |
| 4,528,008 A | * 7/1985 | Takagi et al. | 55/485 |
| 4,925,561 A | * 5/1990 | Ishii et al. | 210/493.3 |
| 5,051,241 A | 9/1991 | Pfefferle | 422/180 |
| 5,118,330 A | * 6/1992 | Gielow et al. | 95/284 |
| 5,204,027 A | * 4/1993 | Armstrong et al. | 261/112.2 |
| 5,253,476 A | 10/1993 | Levendis et al. | 60/279 |
| 5,294,411 A | 3/1994 | Breuer et al. | 422/174 |
| 5,413,741 A | * 5/1995 | Buchholz et al. | 261/112.2 |
| 5,426,936 A | 6/1995 | Levendis et al. | 60/278 |
| 6,544,628 B1 | * 4/2003 | Aull et al. | 428/179 |

FOREIGN PATENT DOCUMENTS

WO 92/16281 * 10/1992 ............. 55/485

* cited by examiner

Primary Examiner—Richard L. Chiesa
(74) Attorney, Agent, or Firm—Kathryn A. Marra

(57) ABSTRACT

A particulate filter for an exhaust system having an exhaust flow and a nominal flow area includes a housing and a plurality of plates arranged parallel to each other within the housing. Each plate has a plurality of orifices and a plurality of micropockets configured to trap exhaust particulates.

18 Claims, 4 Drawing Sheets

METHOD AND APPARATUS FOR FILTERING EXHAUST PARTICULATES

BACKGROUND OF THE INVENTION

The present disclosure relates generally to an exhaust system, and particularly to a particulate filter for an exhaust system.

Automotive exhaust systems for diesel and other internal combustion engines typically include an exhaust subsystem that limits the mass of particulate matter emitted with the exhaust gases. In diesel engine systems, this matter typically includes both carbonaceous components and metallic components. Present filtering methods to trap the exhaust particulates include both surface filtration and depth filtration approaches. Surface filtration relies on interception as the mechanism for particulate filtration, while depth filtration relies on impaction as the main mechanism for particulate filtration. With surface filtration systems, particulate deposits tend to block the flow path and lead to high trapping efficiency and an increase in pressure drop over time. With depth filtration systems, particulate deposits do not block the flow path, which leads to low trapping efficiency and limited change in pressure drop over time. In view of present particulate filter arrangements, it is desirable to have a more advanced particulate filter that can operate in limited space, have sufficient trapping efficiency, and can operate with limited change in its pressure drop characteristics over time.

SUMMARY OF THE INVENTION

In one embodiment, a particulate filter for an exhaust system having an exhaust flow and a nominal flow area includes a housing and a plurality of plates arranged parallel to each other within the housing, each plate having a plurality of orifices and a plurality of micropockets configured to trap exhaust particulates.

In another embodiment, a particulate filter for an exhaust system having an exhaust flow and a nominal flow area includes a housing and a plurality of plates, each plate having a plurality of orifices and a plurality of micropockets arranged within the housing and configured to trap exhaust particulates. The plates are arranged parallel to each other as plate pairs and have their micropockets facing the exhaust flow. The plates have gaps between them that decrease in size in the direction of the exhaust flow. The orifices of each plate are in line with the micropockets of an adjacent plate, each orifice being surrounded by a funnel shaped surface with the bottom of the funnel facing the exhaust flow. The total flow through area of the orifices of each plate is equal to or greater than the nominal flow area of the exhaust system.

In a further embodiment, a method for filtering particulates of an exhaust flow of an exhaust system includes receiving the exhaust flow at one end of a particulate filter, impinging the exhaust flow on the plates, collecting a portion of the particulates at micropockets on the plates, passing a portion of the exhaust flow through orifices on the plates toward a subsequent plate, repeating the impinging, collecting, and passing processes for all plates, and discharging the exhaust flow at an opposite end of the particulate filter. The plates are arranged perpendicular to the exhaust flow and have gaps between them. The orifices of each plate are in line with the micropockets of a subsequent plate.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a particulate filter for an exhaust system of an automotive diesel engine. While the embodiment described herein depicts an automotive diesel engine as an exemplary diesel powerplant using a particulate filter, it will be appreciated that the disclosed invention is also applicable to other diesel powerplants that require the functionality of a particulate filter herein disclosed, such as a diesel powered generator for example. While the disclosed invention is well suited for filtering the combustion byproducts of a diesel engine, it may also be applicable for filtering combustion byproducts of a gasoline powered engine.

Figure 1:
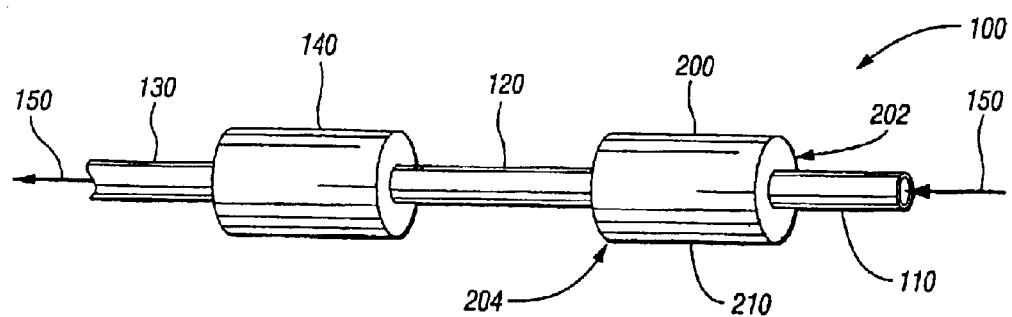
FIG. 1 depicts an exhaust system employing an embodiment of the invention.

An exemplary exhaust system 100 for an automotive diesel engine (not shown) is depicted in FIG. 1 having manifold exhaust pipes 110 suitably connected at one end to exhaust manifolds (not shown) of the diesel engine (not shown) for receiving an exhaust flow, depicted generally as numeral 150, intermediate exhaust pipes 120, a turbocharger exhaust pipe 130 coupled to a tailpipe (not shown) for exhausting the conditioned exhaust flow to atmosphere, a turbocharger 140 suitably connected between intermediate exhaust pipes 120 and turbocharger exhaust pipe 130, and particulate filters 200 suitably connected intermediate manifold exhaust pipes 110 and intermediate exhaust pipes 120 for trapping exhaust particulates present in the exhaust flow 150. Exhaust flow 150 passes from exhaust manifolds (not shown) to manifold exhaust pipes 110, particulate filters 200, intermediate exhaust pipes 120, turbocharger 140, turbocharger exhaust pipe 130, and then to atmosphere. Exhaust system 100 has a nominal flow area equal to or greater than the inside cross-sectional flow area of manifold exhaust pipes 110.

In the embodiment depicted in FIG. 1, particulate filter 200 is arranged in a pre-turbo, as opposed to a post-turbo, location. Since the exhaust gas temperature is higher at a pre-turbo location (versus post-turbo), regeneration of particulate filter 200 may benefit by positioning particulate filter 200 at the pre-turbo location. However, as a filtering device, particulate filter 200 maybe positioned at either a pre-or a post-turbo location.

Figure 2:
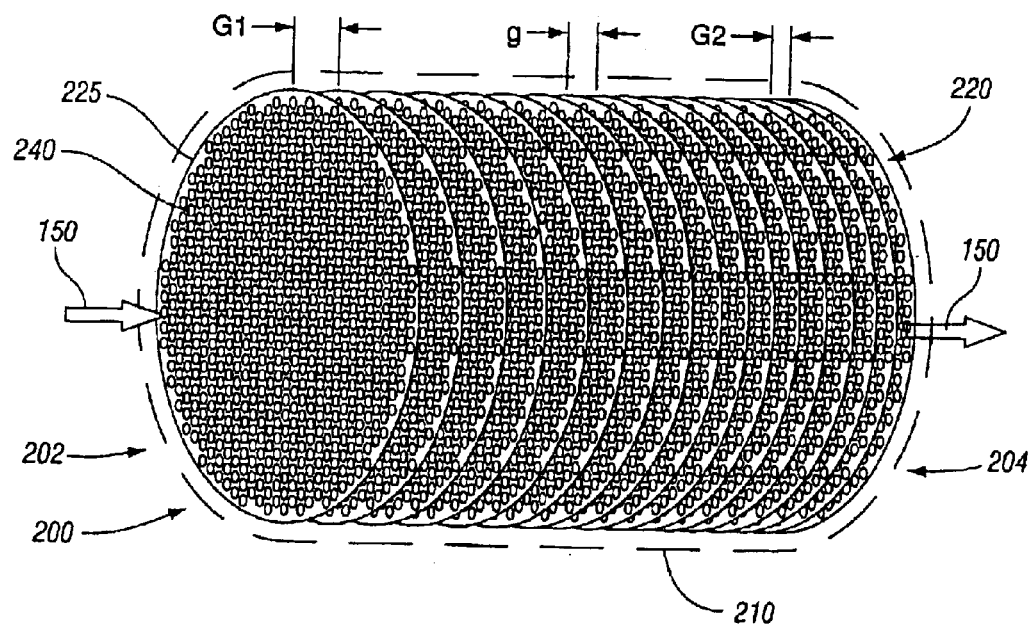
FIG. 2 depicts an isometric view of a particulate filter in accordance with an embodiment of the invention.
Figure 8:
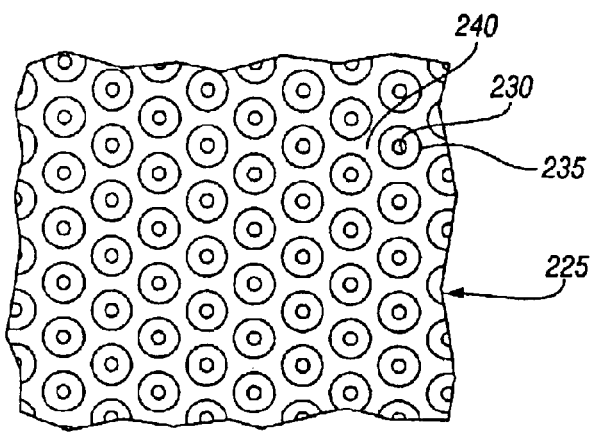
FIG. 8 depicts an alternative front view of the filter plate arrangement depicted in FIG. 4.

Each particulate filter 200 has a housing 210, which may be any form of construction and configuration suitable for the purpose, and a plurality of plates 220 arranged parallel to each other and retained within housing 210 by any means suitable for the purpose, the plurality of plates 220 composing a filter element for trapping exhaust particulates, as best seen by now referring to FIG. 2. Each plate 225 has a plurality of orifices 230 and a plurality of micropockets 240, best seen by referring to FIG. 3, which depicts plates 220 in cross-sectional side view through orifices 230 and micropockets 240. An enlarged front view of a portion of plate 225 is depicted in FIG. 4 showing orifices 230 and micropockets 240 as small and large discs, respectively, and arranged intermediate each other. FIG. 8 depicts an alternative arrangement to the plate 225 of FIG. 4, where orifices 230 are depicted as small discs, funnel shaped surfaces 235 (discussed in reference to FIG. 3 below) surrounding orifices 230 are depicted as larger concentric discs, and micropockets 240 are depicted as the regions between the funnel shaped surfaces 235. An embodiment of particulate filter 200 includes an arrangement of orifices 230 where the total flow through area of orifices 230 on each plate 220 is equal to or greater than the nominal flow area of exhaust system 100, thereby preventing excessive pressure drop within exhaust system 100.

Referring back now to FIG. 3, each plate 225 is formed by known forming means to create crescent shaped micropockets 240 with orifices 230 therebetween and a funnel shaped surface 235 around each orifice 230. Funnel shaped surface 235 may be fabricated, for example, by a die extrusion process. An embodiment of particulate filter 200 has the bottoms of each funnel shaped surface (funnel) 235 facing the exhaust flow 150. The term facing the exhaust flow as used herein refers to the orientation of a part that faces the direction from which the exhaust flow is locally traveling. The arrangement of plates 220 with the bottoms of funnel 235 facing the exhaust flow 150 also results in micropockets 240 facing the exhaust flow 150 (as seen in FIG. 3), that is, the internal crescent shaped surfaces of micropockets 240 face the exhaust flow 150.

Figure 3:
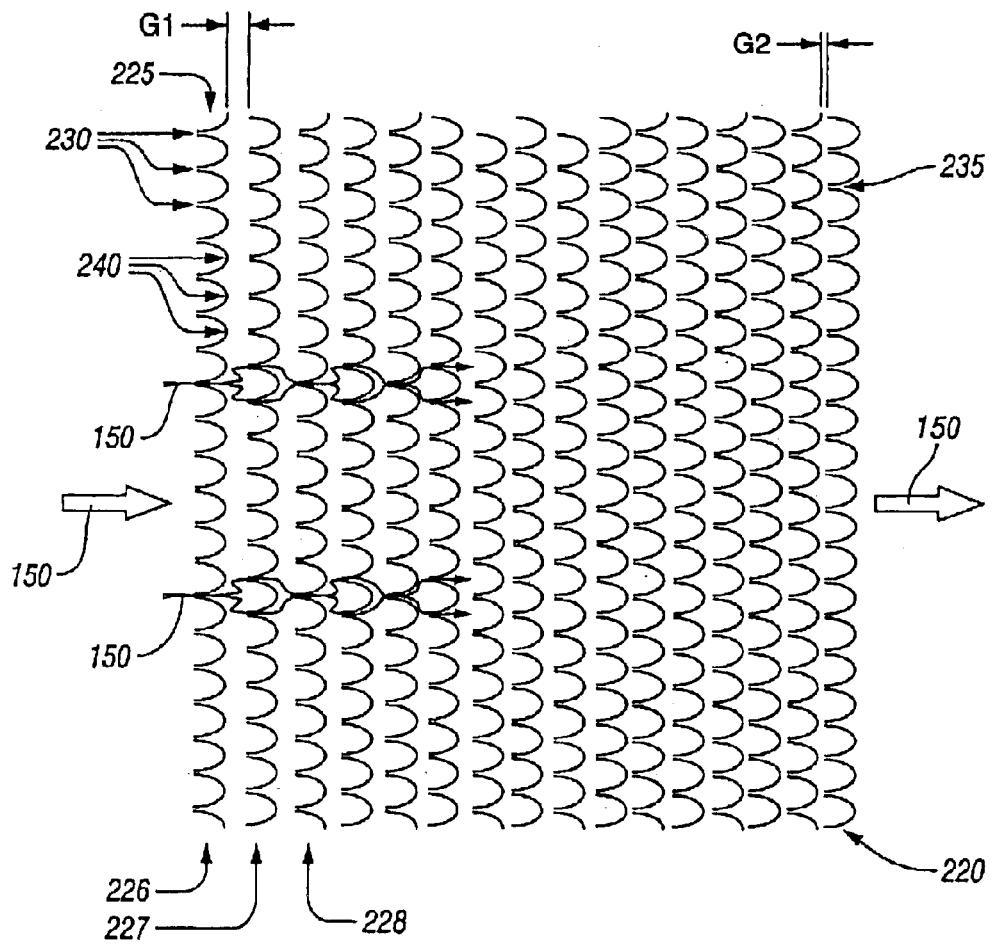
FIG. 3 depicts a cross section side view of an arrangement of filter plates employed in the particulate filter of FIG. 2.
Figure 4:
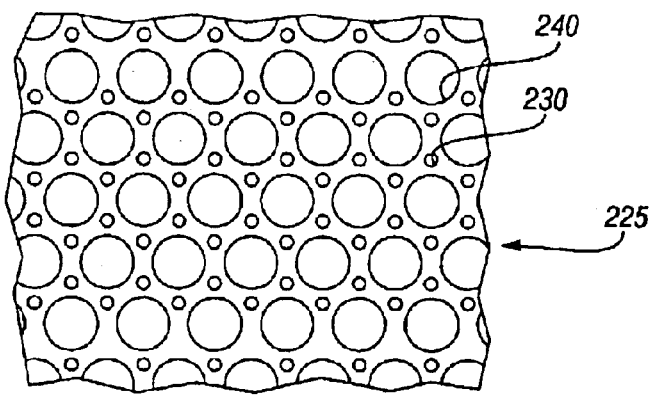
FIG. 4 depicts an enlarged front view of a portion of the filter plate depicted in FIGS. 2 and 3.
Figure 5:
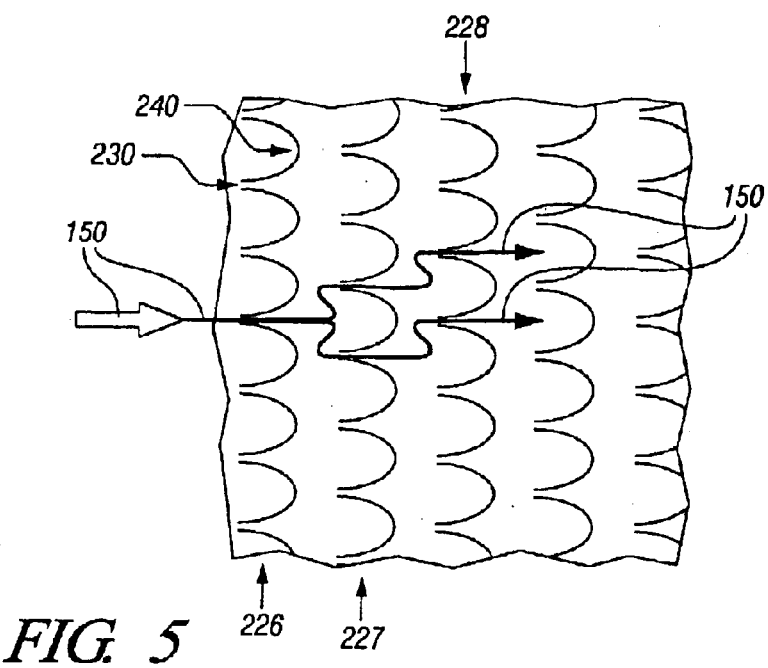
FIG. 5 depicts an enlarged side view of a portion of the filter plate depicted in FIG. 3.

The arrangement of orifices 230 and micropockets 240 on successive plates 220 is such that the orifices 230 of a preceding plate, a first plate 226, are arranged in line with micropockets 240 of a succeeding plate, a second plate 227, as best seen by referring to FIGS. 3 and 5, where FIG. 5 depicts an enlarged side view of a portion of FIG. 3 showing the exhaust flow 150 through orifices 230 of successive plates 220. As depicted in FIG. 5, the exhaust flow 150 through orifices 230 of first plate 226 is directed toward the centers of micropockets 240 of second plate 227, and the exhaust flow 150 through orifices 230 of second plate 227 is directed toward the centers of micropockets 240 of third plate 228. As the exhaust flow 150 travels through particulate filter 200, the crescent shaped micropockets 240 and the offset arrangement of orifices 230 and micropockets 240 from one plate 220 to the next, results in exhaust particulates being trapped in micropockets 240 and the passing of a less contaminated flow to the next plate 220. It will be appreciated that the term in line with as used herein not only refers to an arrangement of orifices 230 of first plate 226 that aim the exhaust flow 150 directly at the center of micropockets 240 of second plate 227, but rather refers to the general flow from one plate 220 to the next where the exhaust flow 150 is directed toward the micropockets in the successive plate for the purpose of trapping exhaust particulates.

Referring now back to FIGS. 2 and 3, an embodiment of particulate filter 200 has an arrangement of plates 220 where the gap G1 between the first two successive plates 220 is greater that the gap G2 between the last two successive plates 220 and where the gap g between each successive plates 220 decreases in dimension in the direction of exhaust flow 150. As exhaust flow 150 travels through particulate filter 200, it is natural for larger particulates to be trapped in the micropockets 240 at the front of particulate filter 200 first, and for smaller particulates to travel further through particulate filter 200. By arranging gap g between each successive plate 220 to decrease in the direction of exhaust flow 150, the smaller particulates can be trapped at the end of particulate filter 200.

Figure 6:
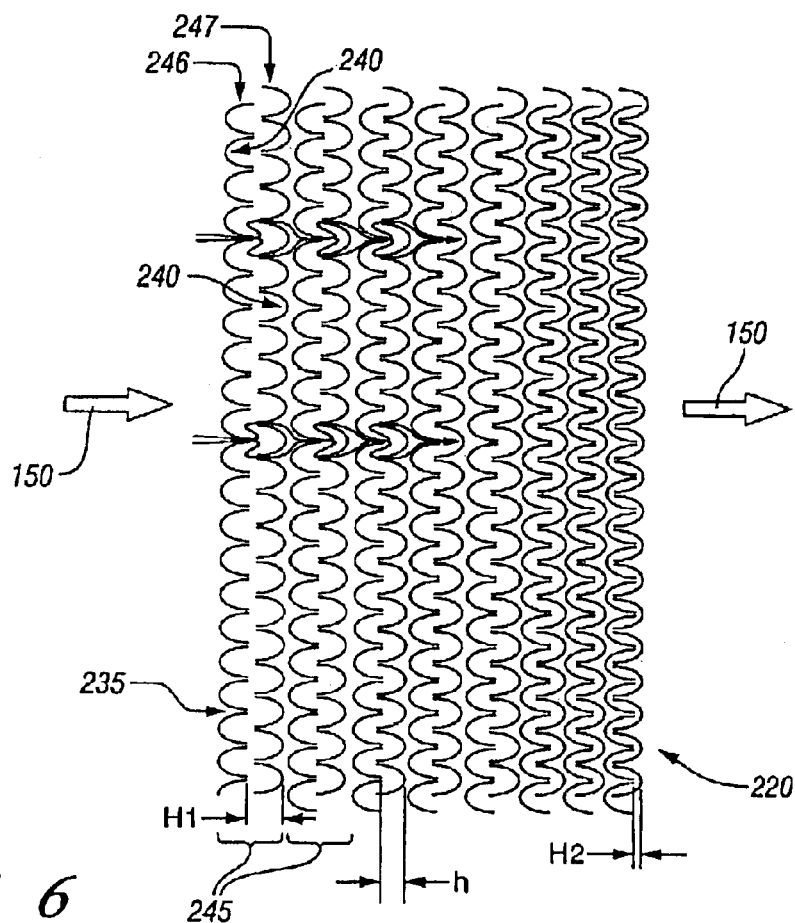
FIG. 6 depicts a cross section side view of another arrangement of filter plates in accordance with an embodiment of the invention.

Another embodiment of particulate filter 200 is depicted in FIG. 6, which shows an arrangement of plates 220 that alternate in direction to produce an arrangement of plate pairs 245 having a first plate 246 and a second plate 247. As depicted in FIG. 6, micropockets 240 of first plate 246 face opposite to the direction of exhaust flow 150 and micropockets 240 of second plate 247 face the direction of exhaust flow 150, and orifices 230 of first plate 246 are arranged in line with micropockets 240 of second plate 247. This arrangement of plate pairs 245 continues for the balance of plates 220 in the particulate filter 200 of FIG. 6. Similar to gap g discussed above, the embodiment depicted in FIG. 6 has a gap h that decreases in the direction of exhaust flow, thereby enabling more effective filtering of smaller particulates. In FIG. 6, gap h refers to the distance between the bottom of funnels 235 of first plate 246 and the bottom of micropockets 240 of second plate 247. As shown, gap H1 in the first plate pair 245 is greater than gap H2 in the last plate pair 245. The embodiment depicted in FIG. 6 provides for a greater packing density of plates 220, thereby resulting in more exhaust filtration per increment of exhaust flow.

In an embodiment of particulate filter 200, the exhaust particulate filtering method begins with particulate filter 200 receiving exhaust flow 150 at one end 202 of particulate filter 200, where exhaust flow 150 then impinges on a plate 225 of a plurality of plates 220, each plate 220 having a plurality of orifices 230 and a plurality of micropockets 240. Plates 220 are arranged perpendicular to the exhaust flow 150, that is, facing the exhaust flow, and have gaps g separating them. In an embodiment, separation gaps g decrease in magnitude in the direction of exhaust flow 150, thereby enabling small particulate filtration, and each micropocket 240 of each plate 220 faces the direction of exhaust flow 150. In another embodiment, orifices 230 are arranged as funnels with funnel shaped surfaces 235, and the bottom of each funnel of each plate 220 is arranged to face the flow stream of exhaust flow 150.

Following the impinging of exhaust flow 150 on plate 225, a portion of the exhaust particulates become trapped, or are collected, at micropockets 240, and a portion of exhaust flow 150 passes through orifices 230 toward a subsequent plate 220. As discussed above, to facilitate filtration, orifices 230 of each plate 220 are in line with associated micropockets 240 of each subsequent plate 220.

The processes involved in impinging the exhaust flow 150 on a plate 220, collecting a portion of the exhaust particulates at micropockets 240, and passing a portion of the exhaust flow to a subsequent plate 220 through orifices 230, continues for the plurality of plates 220 within particulate filter 200. At the opposite end 204 of particulate filter 200, filtered exhaust flow 150 is discharged and received by intermediate exhaust pipes 120.

In another embodiment of particulate filter 200, the exhaust particulate filtering method involves the impinging of exhaust flow 150 on plates 220 where micropockets 240 of each other plate are arranged to face the flow stream of exhaust flow 150. In this embodiment, orifices 230 are arranged as funnels having a funnel shaped surface 235 where the bottoms of each funnel of each other plate 220 face the flow stream of exhaust flow 150. As discussed above, plates 220 are arranged perpendicular to the exhaust flow 150 with separation gaps h therebetween that decrease in magnitude in the direction of exhaust flow 150, thereby enabling small particulate filtration. The bottoms of the funnels of orifices 230 of each other plate 220 direct exhaust flow 150 toward micropockets 240 of each subsequent plate 220.

Figure 7:
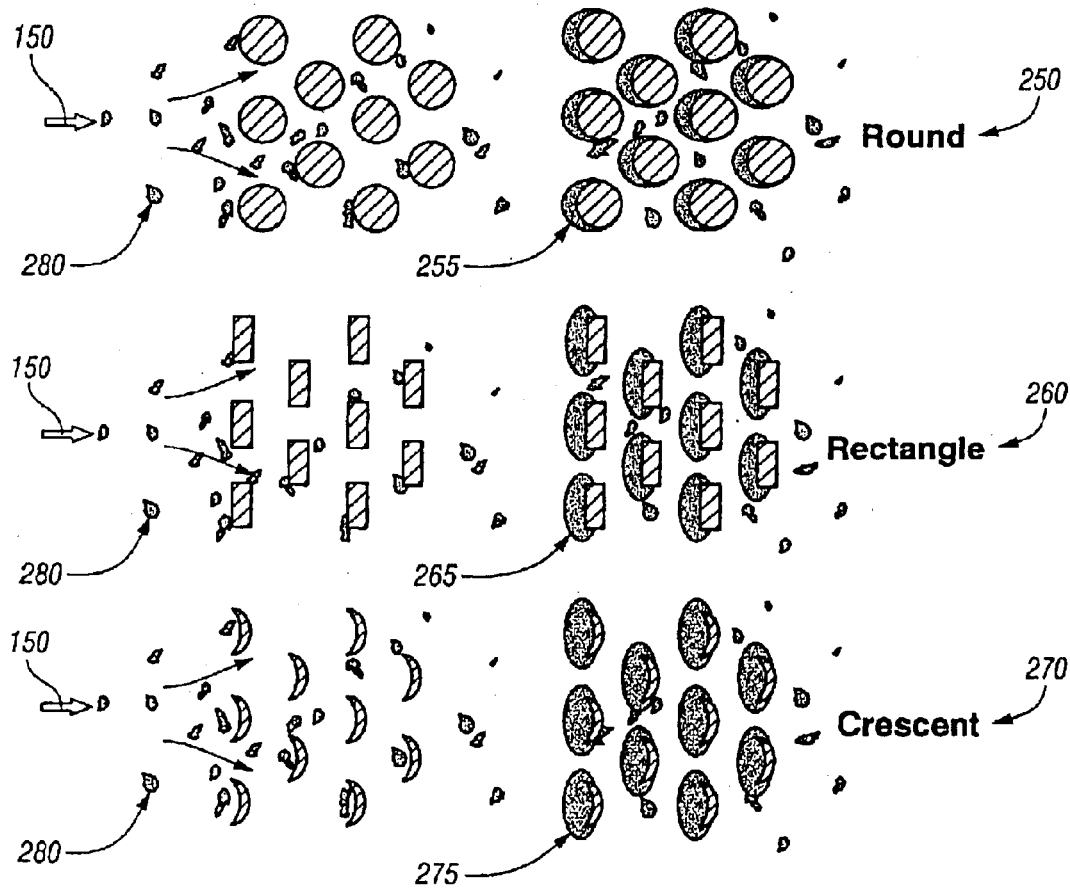
FIG. 7 depicts an enlarged illustrative view of filtration efficiency as a function of micropocket shape and flow rate.

In an embodiment, plates 220 are fabricated from a known metallic substrate composition having iron, chromium, aluminum, and yttrium, which is then coated with a catalyst such as platinum. The catalyzed particulate trap can facilitate low temperature oxidation of carbonaceous components in the deposited particulates. The metallic components in the particulate deposits (known as ash) cannot be burned. Orifices 230 and gaps g and h are sized to allow the passage of ash particles, which are small in size compared to the deposited particulates. In an embodiment, orifices 230 are about 0.05 centimeters in diameter, and gaps g and h are about 0.01 centimeters to about 0.1 centimeters in dimension. FIG. 7 depicts several shapes that may be employed for micropockets 240, including round 250, rectangle 260, and crescent 270. The estimated filtration efficiency is represented by shaded regions 255, 265, 275 for each shape 250, 260, 270, respectively. As depicted, it is estimated that combustion particles 280 will be trapped, or are collected, more efficiently using a crescent shape 270 for micropocket 240.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A particulate filter for an exhaust system having an exhaust flow and a nominal flow area, comprising:
   a housing; and
   a plurality of plates arranged parallel to each other within said housing, each of said plurality of plates having a plurality of orifices and a plurality of micropockets configured to trap exhaust particulates.

2. The particulate filter of claim 1, wherein said plurality of orifices and said plurality of micropockets of each of said plurality of plates are arranged intermediate each other.

3. The particulate filter of claim 2, wherein said plurality of orifices are surrounded by a funnel shaped surface, the bottoms of each funnel of at least one plate of said plurality of plates facing the exhaust flow.

4. The particulate filter of claim 1, wherein said plurality of plates comprises first and second plates each having said plurality of micropockets facing the exhaust flow, said plurality of orifices of said first plate being in line with said plurality of micropockets of said second plate.

5. The particulate filter of claim 4, wherein said plurality of plates define a plurality of gaps therebetween, said plurality of gaps configured to have a non-uniform dimension in the direction of the exhaust flow.

6. The particulate filter of claim 5, further wherein said plurality of gaps are configured having a decreasing dimension in the direction of the exhaust flow.

7. The particulate filter of claim 1, wherein the total flow through area of said plurality of orifices of each of said plurality of plates is equal to or greater than the nominal flow area of the exhaust system.

8. The particulate filter of claim 1, wherein said plurality of plates comprises a plurality of plate pairs including a first plate having said plurality of micropockets facing opposite to the exhaust flow and an adjacent second plate having said plurality of micropockets facing the exhaust flow, said plurality of orifices of said first plate being in line with said plurality of micropockets of said second plate.

9. The particulate filter of claim 8, wherein said plurality of plates define a plurality of gaps therebetween, said plurality of gaps configured to have a non-uniform dimension in the direction of the exhaust flow.

10. The particulate filter of claim 9, further wherein said plurality of gaps are configured having a decreasing dimension in the direction of the exhaust flow.

11. A particulate filter for an exhaust system having an exhaust flow and a nominal flow area, comprising:
   a housing; and
   a plurality of plates arranged parallel to each other within said housing, each of said plurality of plates having a plurality of orifices and a plurality of micropockets configured to trap exhaust particulates,
   said plurality of orifices having a funnel shape, the bottoms of each funnel of at least one plate facing the exhaust flow,
   said plurality of plates comprising a plurality of plate pairs having at least one plate with said plurality of micropockets facing the exhaust flow, said plurality of orifices of one plate being in line with said plurality of micropockets of an adjacent plate,
   said plurality of plates defining a plurality of gaps therebetween, said plurality of gaps being configured to have a decreasing dimension in the direction of the exhaust flow, and
   said plurality of orifices of each of said plurality of plates having a total flow through area equal to or greater than the nominal flow area of the exhaust system.

12. A method for filtering particulates of an exhaust flow of an exhaust system, comprising:
   receiving the exhaust flow at one end of a particulate filter;
   impinging the exhaust flow on a plate of a plurality of plates each having a plurality of orifices and a plurality of micropockets, the plurality of plates arranged perpendicular to the exhaust flow with gaps therebetween;
   collecting a portion of the particulates at the plurality of micropockets of the plate;
   passing a portion of the exhaust flow through the plurality of orifices of the plate toward a subsequent plate, the plurality of orifices of the plate being in line with the micropockets of the subsequent plate;
   repeating said impinging the exhaust flow, said collecting a portion of the particulates, and said passing a portion of the exhaust flow, for the plurality of plates; and discharging the exhaust flow at an opposite end of the particulate filter.

13. The method of claim 12, wherein said impinging the exhaust flow further comprises impinging the exhaust flow on a plate of a plurality of plates, the plurality of micro-pockets of each plate being configured to face the flow stream of the exhaust flow.

14. The method of claim 13, wherein said impinging the exhaust flow further comprises impinging the exhaust flow on a plate of a plurality of plates with the gaps therebetween decreasing in magnitude in the direction of exhaust flow.

15. The method of claim 12, wherein said impinging the exhaust flow further comprises impinging the exhaust flow on a plate of a plurality of plates with the plurality of orifices arranged as funnels, the bottom of each funnel of each of the plurality of plates facing the flow stream of the exhaust flow.

16. The method of claim 12, wherein said impinging the exhaust flow further comprises impinging the exhaust flow on a plate of a plurality of plates, the plurality of micro-pockets of each other plate being configured to face the flow stream of the exhaust flow.

17. The method of claim 16, wherein said impinging the exhaust flow further comprises impinging the exhaust flow on a plate of a plurality of plates with the gaps therebetween decreasing in magnitude in the direction of exhaust flow.

18. The method of claim 16, wherein said impinging the exhaust flow further comprises impinging the exhaust flow on a plate of a plurality of plates with the plurality of orifices arranged as funnels, the bottom of each funnel of each other plate facing the flow stream of the exhaust flow.

* * * * *